United States Patent
Lin

(10) Patent No.: US 7,608,809 B2
(45) Date of Patent: Oct. 27, 2009

(54) SWITCH CIRCUIT OF AN IMAGE SENSOR FOR CHANGING RESOLUTION AND A METHOD THEREOF

(75) Inventor: Chih-Neng Lin, Hsin-Tien (TW)

(73) Assignee: Lite-On Semiconductor Corporation, Taipei Hsien (TW)

( * ) Notice: Subject to any disclaimer, the term of this patent is extended or adjusted under 35 U.S.C. 154(b) by 88 days.

(21) Appl. No.: 11/783,589

(22) Filed: Apr. 10, 2007

(65) Prior Publication Data

US 2008/0251693 A1  Oct. 16, 2008

(51) Int. Cl.
*H01L 27/00* (2006.01)
*H01J 40/14* (2006.01)
*H03K 17/78* (2006.01)

(52) U.S. Cl. .............................. 250/208.1; 250/214 R; 250/214 SW

(58) Field of Classification Search .............. 250/208.1, 250/214 R, 214 SW, 214.1; 348/302–304, 348/307, 308, 311
See application file for complete search history.

(56) References Cited

U.S. PATENT DOCUMENTS

| | | | | |
|---|---|---|---|---|
| 5,874,993 A * | 2/1999 | Ciccarelli et al. | ........... | 348/294 |
| 6,249,618 B1 * | 6/2001 | Hou | ........................... | 382/312 |
| 2003/0058361 A1 * | 3/2003 | Yang | ........................... | 348/311 |
| 2004/0212844 A1 * | 10/2004 | Kato | ........................... | 358/448 |

* cited by examiner

*Primary Examiner*—Que T Le
*Assistant Examiner*—Pascal M Bui-Pho
(74) *Attorney, Agent, or Firm*—Rosenberg, Klein & Lee

(57) ABSTRACT

A resolution switch circuit for an image sensor uses a control unit to control a plurality of image gathering units to generate and store image signals. A resolution control unit controls a plurality of shift registers through the resolution control signals so that the shift registers control the image gathering units to output image signals. The signal combining unit is used to combine the image signals output from the image gathering units to achieve resolution change. Since the resolution switch circuit for the image sensor according to invention does not require additional resolution switch wiring, the affect of noise can be avoided and cost of the circuits can be reduced. The transmission of the image signals in the form of charges prevents any signal distortion due to resistance of wiring during transmission.

10 Claims, 9 Drawing Sheets

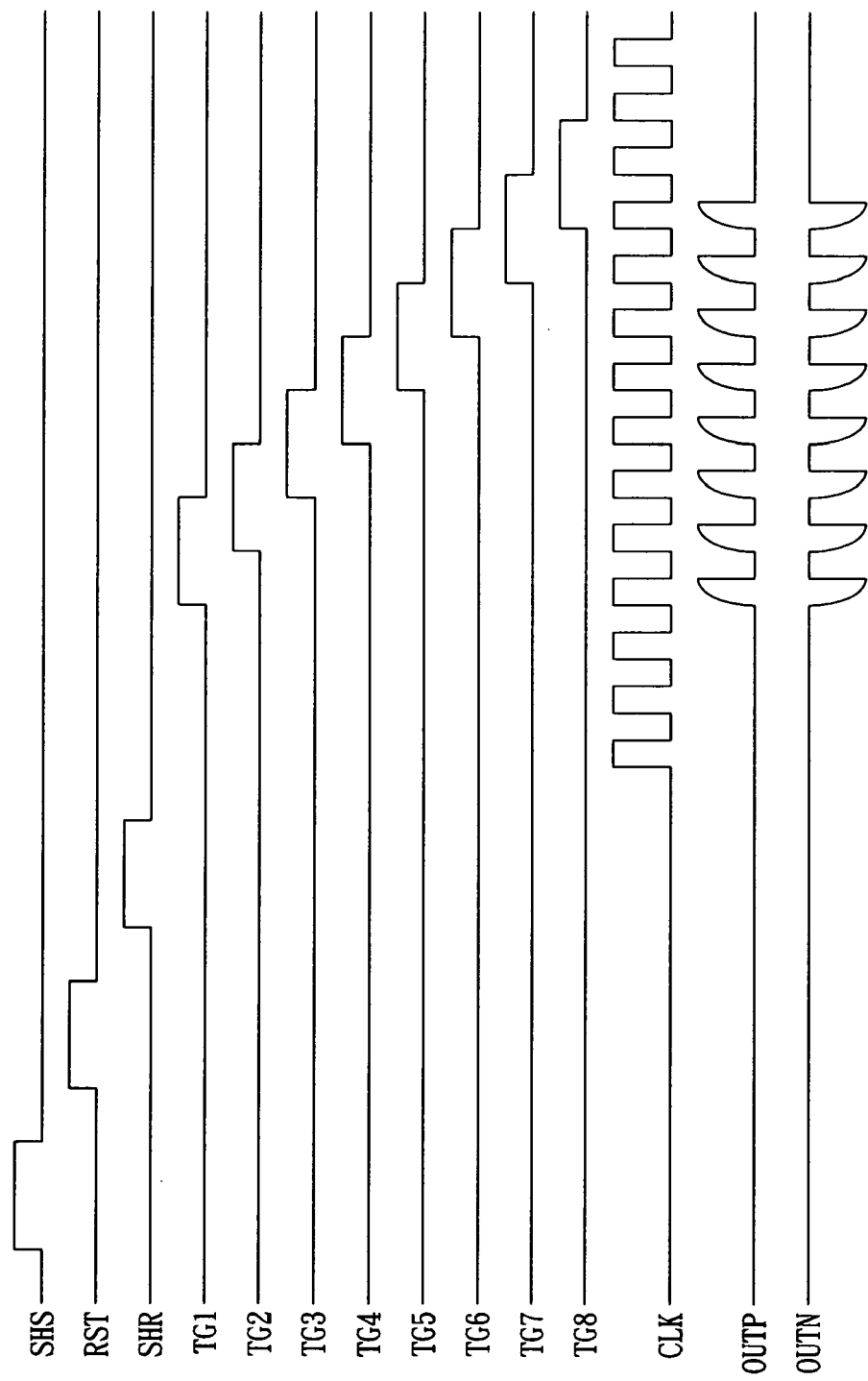

SWITCH CIRCUIT OF AN IMAGE SENSOR FOR CHANGING RESOLUTION AND A METHOD THEREOF

BACKGROUND OF THE PRESENT INVENTION

1. Field of the Present Invention

The present invention generally relates to a resolution switch circuit, and more particularly to a resolution switch circuit for a contact image sensor and a method of changing the resolution value for an image sensor.

2. Description of the Related Art

FIG. 1 is a circuit graph of a conventional switch circuit for a contact image sensor. Referring to FIG. 1, the conventional switch circuit can change resolution. A control unit 11 uses the fourth control signals CON1-CON4 to control the operation of a sensing element-terminal resolution switch circuit 12, and uses the fourth control signals CON5, CON6 to control the operation of the shift register-terminal resolution switch circuit 15. Such a switch circuit produces a lot of noise, and thus suffers from signal uniformity, high production costs and a complex wiring structure.

SUMMARY OF THE INVENTION

Therefore, the present invention provides a resolution switch circuit of an image sensor, which does not need additional resolution switch circuits such as a sensing element-terminal resolution switch wiring or a shift register-terminal resolution switch wiring, and thus avoids any negative affects of noise, increases the signal/noise ratio and lowers the cost of the circuit. Furthermore, the output of internal first image signals and second image signals is achieved by using a switch capacitor (SC) in which the signals are transmitted in form of charges. By means of avoiding generating any difference of resistance in the signal output wiring, the present invention prevents signal distortion during transmission and increases signal uniformity. The circuit of the present invention does not require the transistors used in the conventional optical signal converting unit, which results in reduced production costs.

One object of the invention is to provide a resolution switch circuit of an image sensor, including a plurality of image gathering units respectively used to gather an image and to generate accordingly a first image signal and a second image signal based on the image. A signal combining unit is connected to the image gathering units to combine the first image signals and combine the second image signals. A control unit is connected to the image gathering units and the signal combining units to control the image gathering units and the signal combining unit. A plurality of shift registers, is connected to the image gathering units to control the transmission of the first image signals and combine the second image signals to the signal combining unit. Lastly, a resolution control unit is connected to the shift registers to generate at least one resolution control signal to control the shift registers for resolution changing.

The invention further provides a method of changing a resolution value for an image sensor. A control unit controls a plurality of image gathering units to gather an image so that each of the image gathering unit generates a plurality of first image signals and a plurality of second image signals. Then a resolution control unit generates a corresponding resolution control signal according to desired resolution to control a plurality of shift registers. The shift registers respectively generate an output control signal according to the resolution control signal to control the image gathering units to output the first image signals and the second image signals to a signal combining unit. Finally, the signal combining unit combines the first image signals and combines the second image signals.

To provide a further understanding of the present invention, the following detailed description illustrates embodiments and examples of the present invention, this detailed description being provided only for illustration of the present invention.

BRIEF DESCRIPTION OF THE DRAWINGS

FIG. 5 is a timing diagram of a normal resolution signal of a resolution switch circuit for an image sensor according to one embodiment of the invention.

DETAILED DESCRIPTION OF PREFERRED EMBODIMENTS

Figure 1:
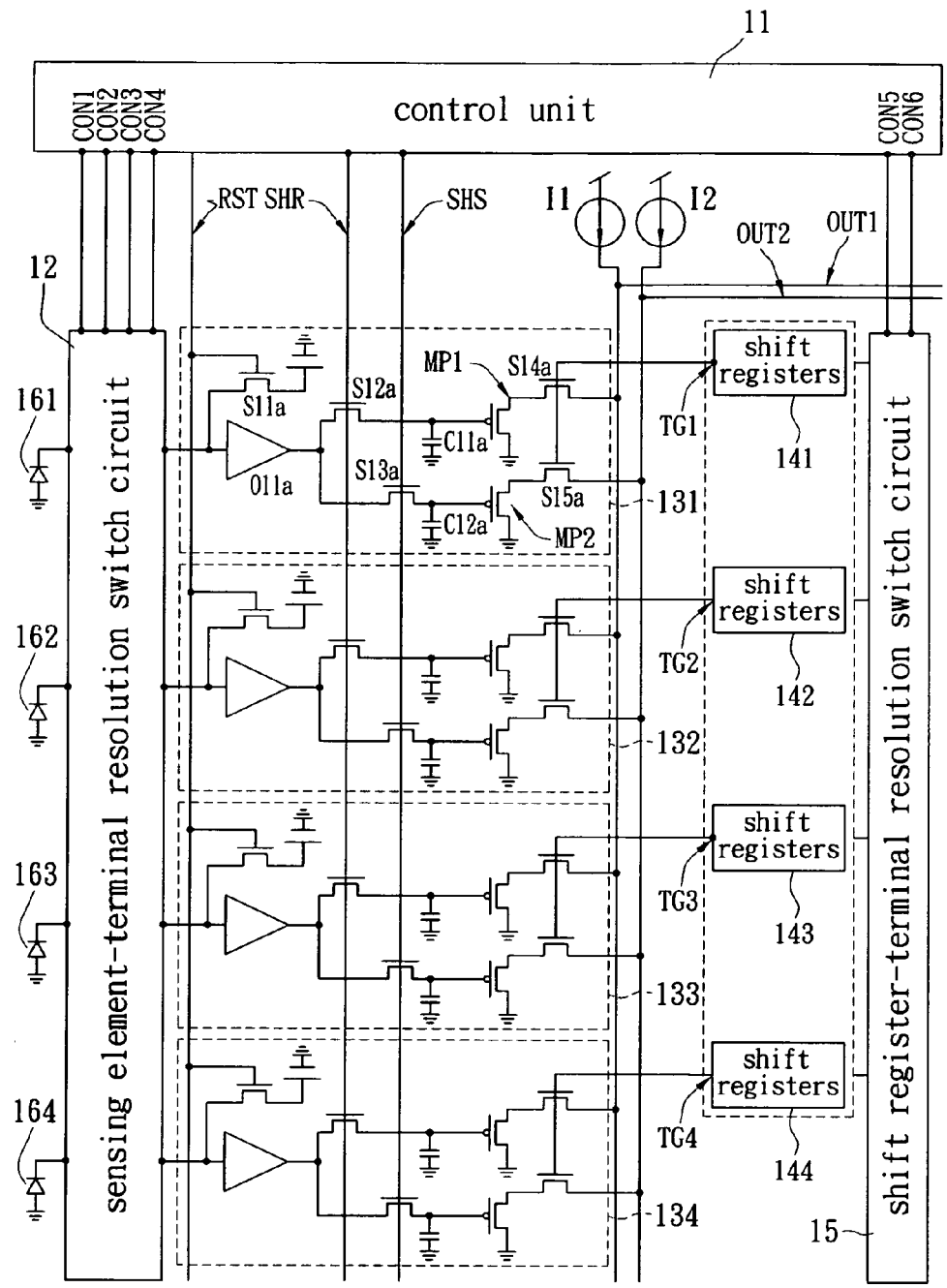
FIG. 1 is a diagram of a switch of a conventional contact image sensor.

Wherever possible in the following description, like reference numerals will refer to like elements and parts unless otherwise illustrated.

Figure 2:
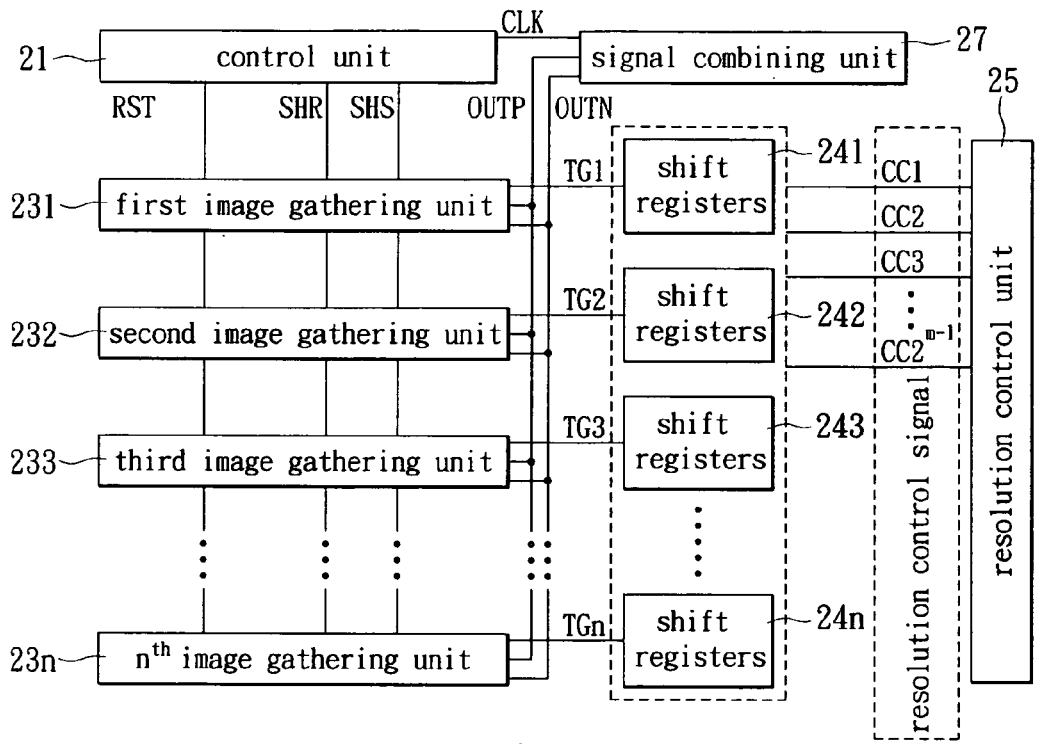
FIG. 2 is a block diagram of a resolution switch circuit for an image sensor according to one embodiment of the invention.

FIG. 2 is a block diagram of a resolution switch circuit for an image sensor according to one embodiment of the invention. Referring to FIG. 2, the resolution switch circuit for the image sensor according to the invention includes a control unit 21, a plurality of image gathering units 231-23n, a plurality of shift registers 241-24n, a resolution control unit 25, and a signal combining unit 27. The control unit 21 sends out a first control signal RST, a second control signal SHR, and a third control signal SHS to control the image gathering and image signal storing of the first image gathering unit 231, the second image gathering unit 232 . . . and the $n^{th}$ image gathering unit 23n. A fourth control signal CLK controls the signal combining unit 27 so that the signal combining unit 27 receives the image signals generated by the image gathering units 231-23n through a first image output wiring OUTP and a second image output wiring OUTN. The resolution control unit 25 outputs a plurality of resolution control signals CC1-$CC2^{m-1}$ according to the change in resolution (wherein m is the number of resolution, and is an integer) to control the output of signals from the shift registers 241-24n. The shift registers 241-24n output a plurality of output control signals TG1-TGn according to the resolution control signals CC1-$CC2^{m-1}$ to control the output of the image signals gathered by the image gathering units 231-23n to the signal combining unit 27. Under the timing control of the control signals (RST, SHR, SHS, CLK, TG1-TGm), the images can be gathered and transmitted according to the desired resolution value. The image gathering units 231-23n are arranged in line so as to gather the target images precisely.

Below will follow the detailed description of controlling of the image gathering units 231-23n and the signal combining unit 27 via the respective signals RST, SHR, SHS, CLK, TG1-TGn.

Taking the first image gathering unit 231 as an example, the first image gathering unit 231 receives the first control signal RST, the second control signal SHR, the third control signal SHS, and the shift register by the first control unit 21, and receives the output control signal TG1 generated by the shift register 241 to output a first image signal and a second image signal. The first image gathering unit 231 includes an optical signal converting unit 2311, a second switch S12, a third switch S13 and a fourth switch S14, a fifth switch S15, a first charge storage element C11 and a second power storage element C12. The optical signal converting unit 2311 includes a reset voltage Vrst, a switch S11, an operational amplifier O11, and an image sensing element D1. The optical signal converting unit 2311 receives the first control signal RST to actuate the first switch S11 and then reset the optical signal converting unit 2311 by the reset voltage Vrst so that the image sensing element D1 senses an image which is then transmitted to the operational amplifier O11 to amplify and to obtain a first image signal and a second image signal. The operational amplifier O11 sends the first image signal to the first charge storage element C11 for storage through the second switch S12, and sends the second image signal to the second power storage element C12 for storage through the third switch S13. In one embodiment of the invention, the first image signal is a light signal and the second image signal is a dark signal. The second switch S12 operates according to the second control signal SHR to store the first image signal in the first power storage element C11. The third switch S13 operates according to the third control signal SHS to store the second image signal in the second power storage element C12. The fourth S14 and the fifth switch S15 receive the output control signal TG1 from the shift register 241, and output the first image signal stored in the first power storage element C11 and the second image signal stored in the second power storage element C12 respectively through the first image output wiring OUTP and the second image output wiring OUTN.

Similarly, the second image gathering unit 232 receives the first control signal RST to control an internal optical signal converting unit (not shown). The second signal SHR and the third control signal SHS control an internal second switch and third switch (not shown) to store the first image signal and the second image signal. The output control signal TG2 from the shift register 242 controls an internal fourth switch (not shown) and a fifth switch (not shown). The first image output wiring OUTP and the second image output wiring OUTN output the first image signal and the second image signal of the second image gathering unit 232. Similarly, the $n^{th}$ image gathering unit 23n receives the output control signal TGn to output the first image signal and the second image signal of the nth image gathering unit 23n.

Figure 4A:
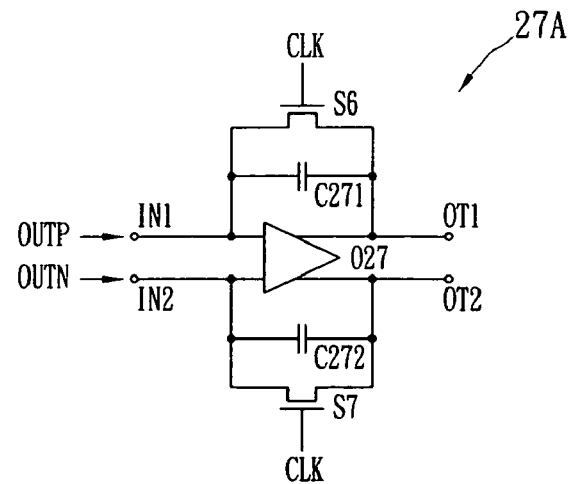
FIG. 4A is a circuit diagram showing a signal combining unit according to a first embodiment of the invention.

In the signal combing unit 27, the fourth control signal CLK from the control unit 21 and the first image signal and the second image signal from the image gathering units 231-23n are combined. FIG. 4A is a circuit diagram showing a signal combining unit according to a first embodiment of the invention. The signal combining unit 27A includes a double-input/output operational amplifier O27, a sixth switch S6, a seventh switch S7, a capacitor C271, and a capacitor C272. The sixth switch S6 connects to the capacitor C271 in series, and further connects to the first signal receiving terminal IN1 and a first output terminal OT1 of the operational amplifier O27. The seventh switch S7 connects to the capacitor C272 in series, and further connects to a second signal receiving terminal IN2 and a second output terminal OT2 of the operational amplifier O 27. The first signal receiving terminal IN1 connects to the first image output wiring OUTP to receive the first image signal. The second output terminal OT2 connects to the second image output wiring OUTN to receive the second image signal. The sixth switch S6 and the seventh switch receive the fourth control signal to rest the first image output wiring OUTP and the second image output wiring OUTN. Meanwhile, the operational amplifier O27 receives the first image signal and the second image signal, and then respectively generates a first combined signal and a second combined signal. The first output terminal OT1 and the second output terminal OT2 respectively output the first combined signal and the second combined signal, the difference between which, are then calculated.

Figure 4B:
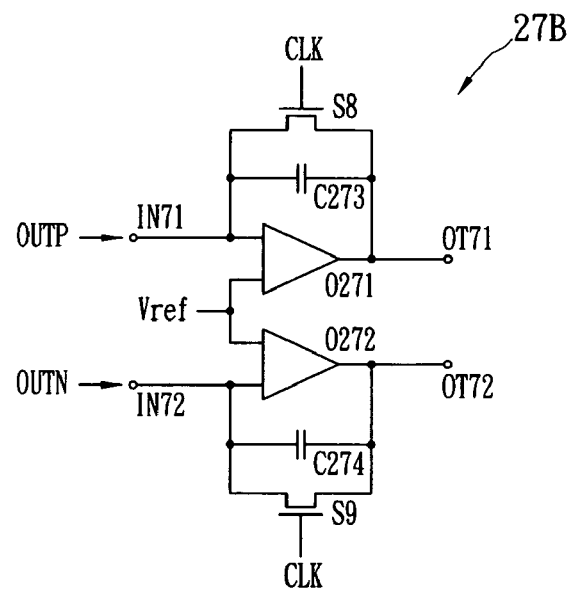
FIG. 4B is a circuit diagram of a signal combining unit according to a second embodiment of the invention.

FIG. 4B is a circuit diagram of a signal combining unit according to a second embodiment of the invention. The signal combining unit 27B includes a first operational amplifier O271, a second operational amplifier O272, a eighth switch S8, a ninth switch S9, a capacitor C273, and a capacitor C274. The eighth switch S8 connects to the capacitor C273 in series, and further connects to the first signal receiving terminal IN 71 and the first output terminal OT71 of the first operational amplifier O271. The ninth switch S9 connects to the capacitor C274 in series and further connects to the second signal receiving terminal IN72 and the second output terminal OT72 of the second operation amplifier O272. The first signal receiving terminal IN71 connects to the first image output wiring OUTP to receive the first image signal. The second output terminal OT72 connects to the second image output wiring OUTN to receive the second image signal. The first other terminals of the first operational amplifier O271 and the second operational amplifier O272 connect to a constant bias Vref. The eighth switch S8 and the ninth switch S9 respectively receive the fourth control signal to reset the first image output wiring OUTP and the second image output wiring OUTN. Meanwhile, the first operational amplifier O271 and the second operational amplifier O272 respectively receive the first image signal and the second image signal. The first operational amplifier O271 generates the first combined signal based on the first image signal and then outputs the first combined signal through the first output terminal OT71. The second operational amplifier O272 generates the second combined signal based on the second image signal and then outputs the second combined signal through the second output terminal OT72.

Figure 5A:
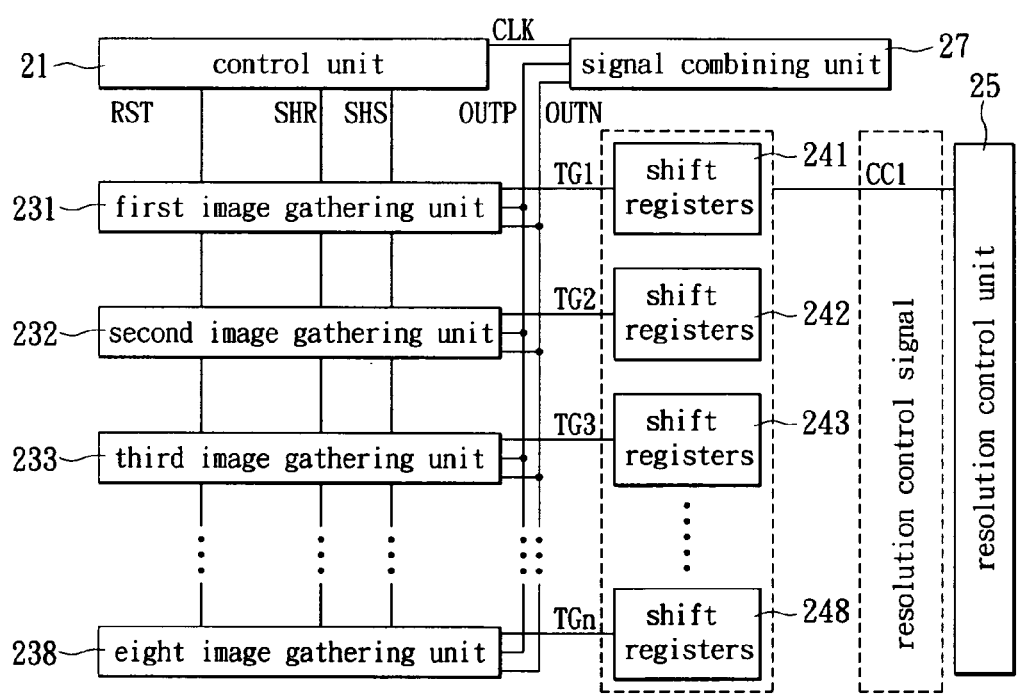
FIG. 5A is a block diagram of a resolution switch circuit for an image sensor under normal resolution conditions according to one embodiment of the invention.

FIG. 5 is a timing diagram of a normal resolution signal of a resolution switch circuit for an image sensor according to one embodiment of the invention. FIG. 5A is a block diagram of a resolution switch circuit for an image sensor under normal resolution conditions according to one embodiment of the invention. Although the invention is illustrated by exemplifying the resolution switch circuit of 1×8 in array, the size of the array used in the resolution switch circuit according to the invention is not limited to 1×8.

Figure 3:
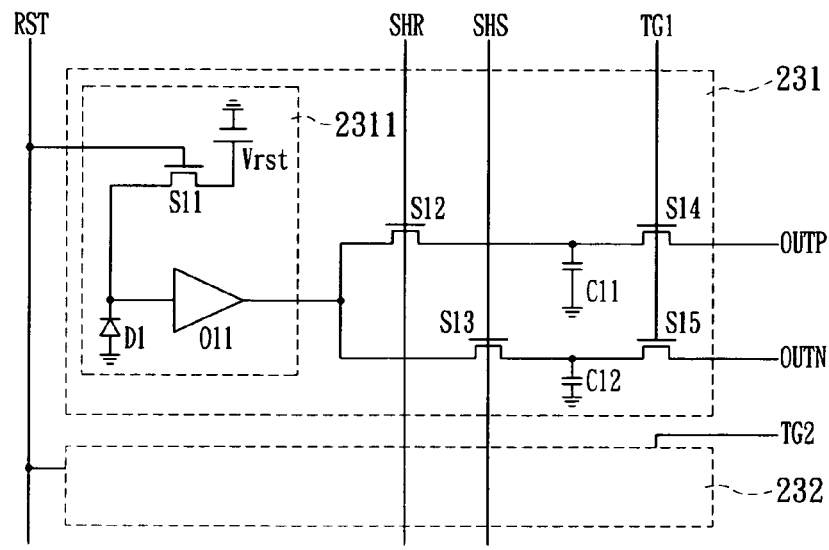
FIG. 3 is a circuit diagram showing an image gathering unit of a resolution switch circuit for an image sensor according to one embodiment of the invention.

When the resolution switch circuit is operating under normal resolution conditions, the control unit 21 sends out the first control signal RST, the second control signal SHR, and the third signal SHS. Each of the image gathering units 231-238 accordingly generates the first image signal and the second image signal which are then stored in the power storage element of corresponding image gathering units 231-238. Since the resolution is under normal conditions (m=1), the resolution control unit 25 does need a resolution control signal for CC1, wherein the number of the resolution control signal is $2^{m-1}$. The shift registers 241-248 in turn generate output control signals TG1-TG8. By means of using the output control signals TG1-TG8 to actuate the fourth switch and the fifth switch of respective image gathering units 231-238, the image gathering units 231-238 in turn transmit the stored first image signal and the stored image signal to the signal combining unit 27 through the first image output wiring OUTP and the second image output wiring OUTN, as shown in FIG. 3.

Figure 6:
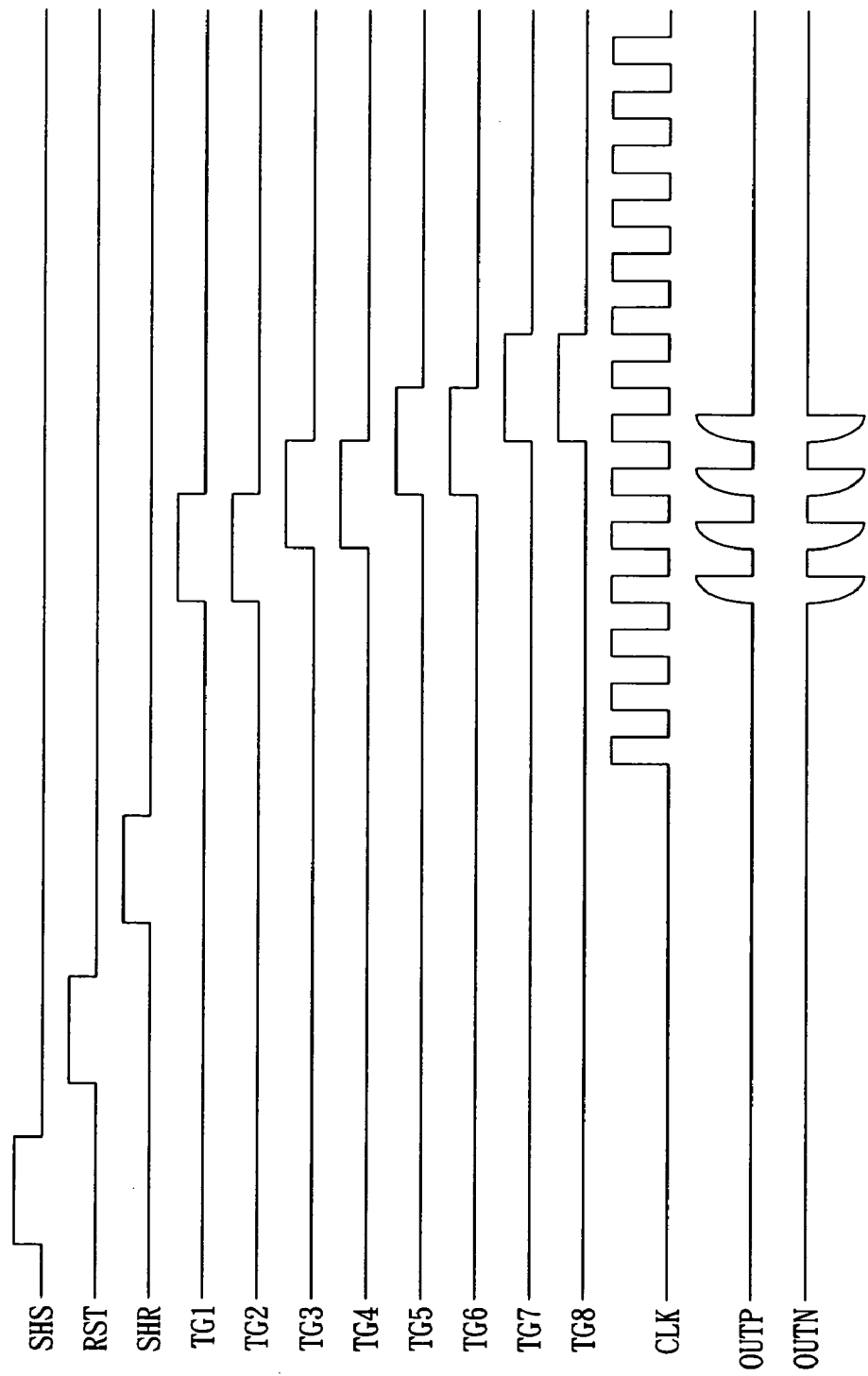
FIG. 6 is a timing diagram of a resolution switch circuit at ½ resolution according to another embodiment of the invention.
Figure 6A:
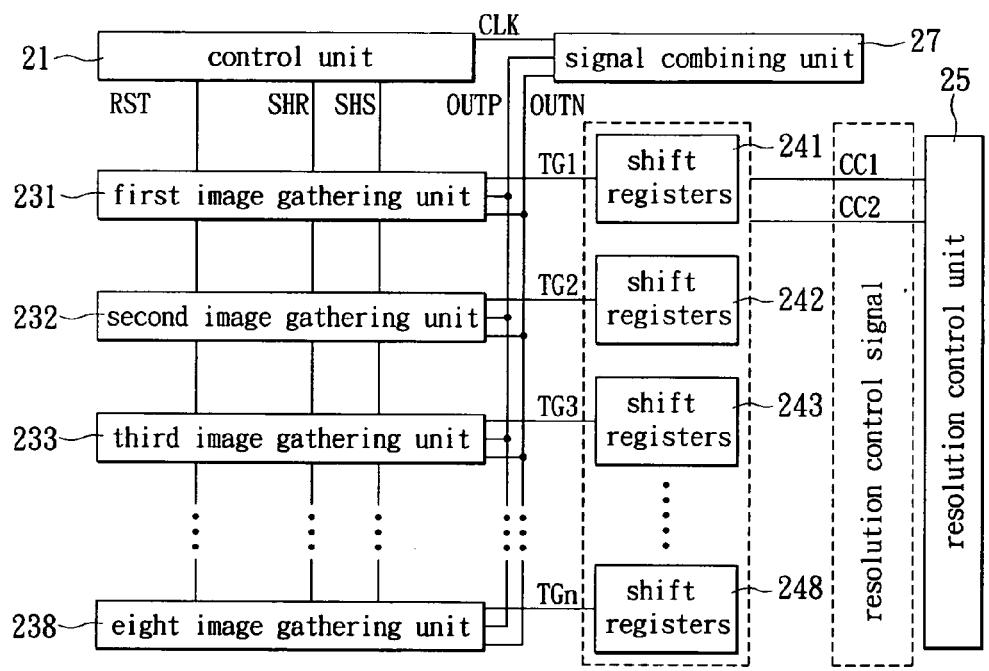
FIG. 6A is a block diagram of a resolution switch circuit at ½ resolution according to another embodiment of the invention.

FIG. 6 is a timing diagram of a resolution switch circuit at ½ resolution according to another embodiment of the invention. FIG. 6A is a block diagram of a resolution switch circuit at ½ resolution according to another embodiment of the invention. In a case in which the resolution is lowered down to ½ of the normal resolution value, the control unit 21 sends out the first control signal RST, the second control signal SHR and the third control signal SHS so that each of the image gathering units 231-238 generates the first image signal and the second image signal which are then stored in the power storage element of the corresponding image gathering units 231-238. The resolution control unit 25 needs two resolution control signals for CC1 and CC2 for the normal resolution condition and ½ resolution condition (m=2). Next, the shift registers 241-248 in turn generate the output control signals TG1, TG2, the output signals TG3, TG4, the output control signal TG5, TG6 and the output control signals TG7, TG8. The fourth switch and the fifth switch of the first image gathering unit 231 and the second image gathering unit 232 are actuated first. Then the fourth switch and the fifth switch of the third image gathering unit 233 and the fourth image gathering unit 234 are actuated. Then the fourth switch and fifth switch of the fifth image gathering unit 235 and the sixth image gathering unit 236 are actuated. The fourth switch and the fifth switch of the seventh image gathering unit 237 and the eighth image gathering unit 238 are actuated. In this way, the image gathering units 231-238 in turn transmit the stored first image signal and the second image signal to the signal combining unit 27 through the first image output wiring OUTP and the second image output wiring OUTN so as to lower the resolution value.

Figure 7:
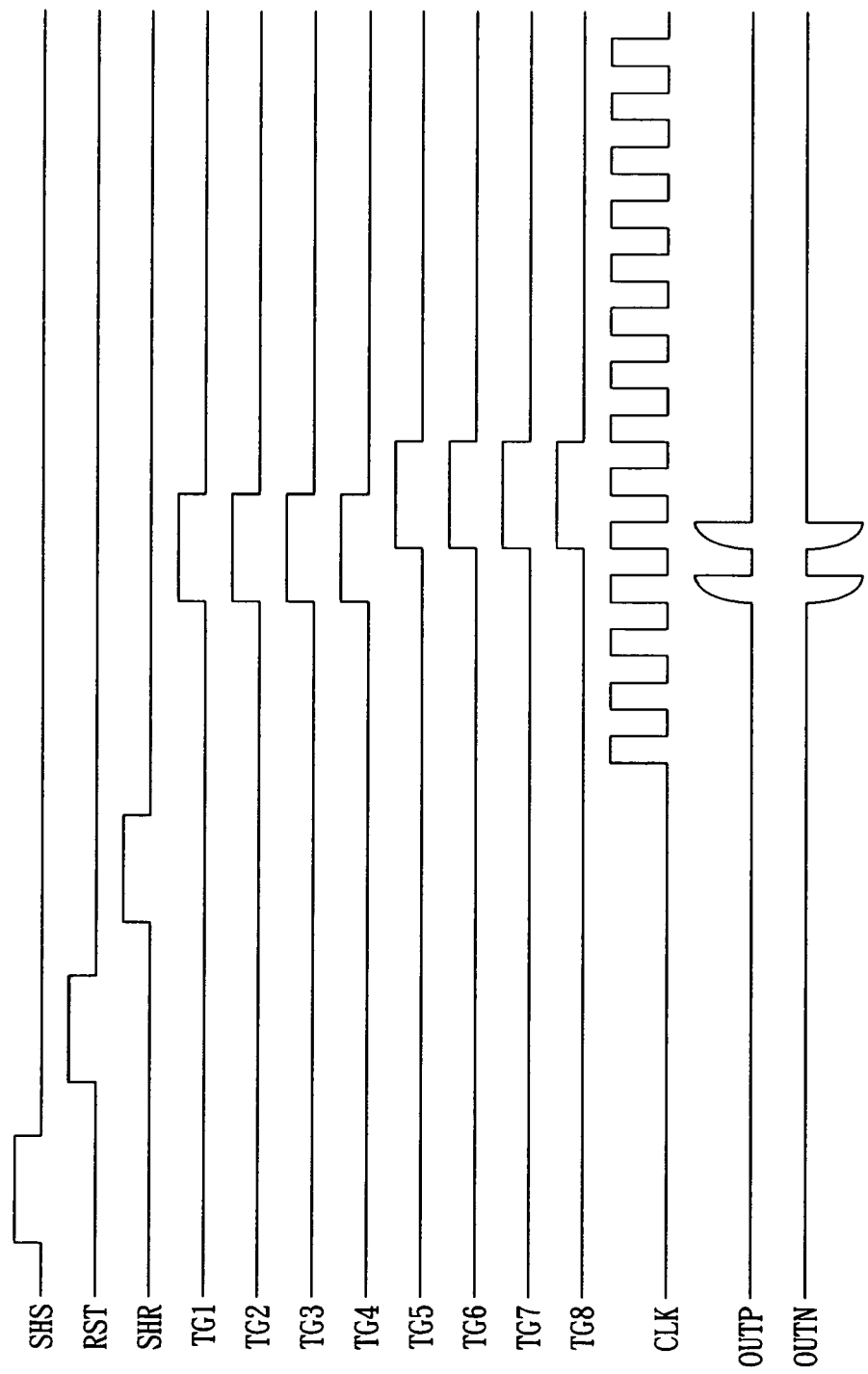
FIG. 7 is a timing diagram of a resolution switch circuit at ¼ resolution according to another embodiment of the invention.
Figure 7A:
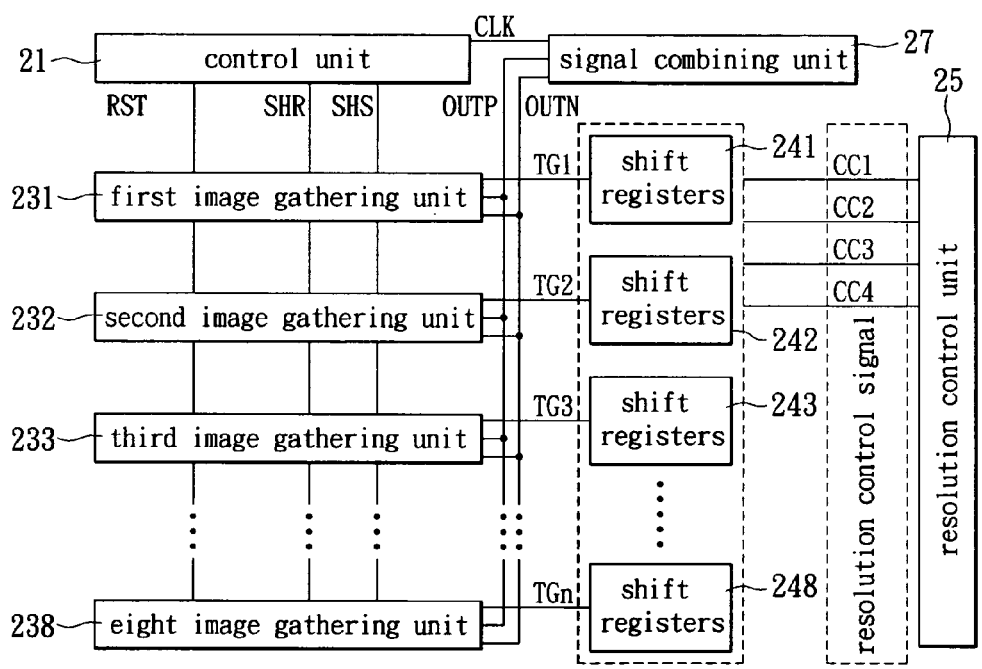
FIG. 7A is a block diagram of a resolution switch circuit at ¼ resolution according to another embodiment of the invention.

FIG. 7 is a timing diagram of a resolution switch circuit at ¼ resolution according to another embodiment of the invention. FIG. 7A is a block diagram of a resolution switch circuit at ¼ resolution according to another embodiment of the invention. In the case that the resolution is lowered down to ¼ of normal resolution value, the control unit 21 sends out the first control signal RST, the second control signal SHR and the third control signal SHS so that each of the image gathering units 231-238 generate the first image signal and the second image signal which are then stored in the power storage element of the corresponding image gathering units 231-238. The resolution control unit 25 needs four resolution control signals for CC1, CC2, CC3 and CC4 for the normal resolution condition, ½ resolution condition and ¼ resolution condition (m=3). Next, the shift registers 241-248 in turn generate the control signals TG1, TG2, TG3, TG4, and the output control signal TG5, TG6, TG7, TG8. The fourth switch and the fifth switch of the first image gathering unit 231, the second image gathering unit 232, the third image gathering unit 233, and the fourth image gathering unit 234 are actuated first. Then the fourth switch and fifth switch of the fifth image gathering unit 235, the sixth image gathering unit 236, the seventh image gathering unit 237, and the eighth image gathering unit 238 are actuated. In this way, the image gathering units 231-238 in turn transmit the stored first image signal and the second image signal to the signal combining unit 27 through the first image output wiring OUTP and the second image output wiring OUTN so as to lower the resolution value.

It should be apparent to those skilled in the art that the above description is only illustrative of specific embodiments and examples of the present invention. The present invention should therefore cover various modifications and variations made to the herein-described structure and operations of the present invention, provided they fall within the scope of the present invention as defined in the following appended claims.

What is claimed is:

1. A resolution switch circuit of an image sensor for changing resolution, comprising:
   a plurality of image gathering units, respectively used to gather an image and generate accordingly a first image signal and a second image signal based on the image;
   a signal combining unit, connected to the image gathering units to combine the first image signals and combine the second image signals;
   a control unit, connected to the image gathering units and the signal combining unit to control the image gathering units and the signal combing unit;
   a plurality of shift registers, connected to the image gathering units to control the transmission of the first image signals and combine the second image signals to the signal combing unit;
   a resolution control unit, connected to the shift registers to generate at least one resolution control signal to control the shift registers for changing the resolution value;
   the image gathering units transmit the first and second image signals in form of charges to the signal combining unit by using circuit which has a switch and a power storage unit, wherein the image gathering units comprising;
      an optical signal converting unit, used to receive a first control signal of the control unit to gather the image and generate the first image signal and the second image signal;
      a second switch, connected to the optical signal converting unit to receive a second control signal of the control unit to store the first image signal in a first power storage element;
      a third switch, connected to the optical signal converting unit to receive a third control signal of the control unit to store the second image signal in a second power storage element;
      a fourth switch, connected to the second switch, the first power storage element and a first image output wiring to receive an output control signal provided by the corresponding shift register, the first image signal being thereby controlled to be transmitted to the signal combining unit through the first image output wiring; and
      a fifth switch, connected to the third switch, the second power storage element and a second image output wiring to receive the output control signal, the second image signal being thereby controlled to be transmitted to the signal combining unit through the second image output wiring.

2. The resolution switch circuit of claim 1, wherein the shift registers provide a plurality of output control signals to control the image gathering units to transmit the first image signal and the second image signals to the signal combining unit.

3. The resolution switch circuit of claim 2, wherein the resolution control unit outputs $2^{m-1}$ resolution control signals according to the value of m to control the output control signals generated by the shift registers, wherein m is the number of resolution and is an integer.

4. The resolution switch circuit of claim 1, wherein the optical signal converting unit comprises:
   an image sensing element, used to sense the image to generate the first image signal and the second image signal;
   a first switch, connected to a reset voltage and the image sensing element to receive the first control signal to convert the optical signal into a unit weight and to sense the image; and
   an operational amplifier, connected to the image sensing element to amplify the first image signal and the second image signal which are then respectively stored in the first power storage element and the second power storage element respectively through the second switch and the third switch.

5. The resolution switch circuit of claim 1, wherein the signal combining unit further comprises a double-input/output operational amplifier to receive the first image signals and the second image signals, to combine the first image signals and to combine the second image signals.

6. The resolution switch circuit of claim 5, wherein the signal combining unit further comprises:
   a sixth switch, connected to the first image signal input terminal and the first output terminal of the double-input/output operational amplifier to receive a fourth control signal of the control unit so that the wiring for transmitting the first image signals between the signal combining unit and the image gathering units can be reset, and
   a seventh switch, connected to the second image signal input terminal and the second output terminal of the double-input/output operational amplifier to receive the fourth control signal of the control unit so that the wiring for transmitting the second image signals between the signal combining unit and the image gathering units can be reset.

7. The resolution switch circuit of claim 1, wherein the signal combining unit comprises:
   a first operational amplifier, used to receive the first image signals and combine the first image signals; and
   a second operational amplifier, used to receive the second image signals and combine the second image signals.

8. The resolution switch circuit of claim 7, wherein the signal combining unit provides a constant bias to the first operational amplifier and to the second operational amplifier to output the combined first image signal and the combined second image signal.

9. The resolution switch circuit of claim 7, wherein the signal combining unit further comprises:
   a first image reset switch, connected to the first image signal input terminal and the output terminal of the first operational amplifier to receive a fourth control signal of the control unit so that the wiring for transmitting the first image signals between the signal combining unit and the image gathering units can be reset; and
   a second image reset switch, connected to the second image signal input terminal and the second output terminal of the second operational amplifier to receive the fourth control signal so that the wiring for transmitting the second image signals between the signal combining unit and the image gathering units can be reset.

10. The resolution switch circuit of claim 1, wherein the image gathering units are arranged in line.

* * * * *